(12) United States Patent
Ohta et al.

(10) Patent No.: US 9,969,496 B2
(45) Date of Patent: May 15, 2018

(54) LIGHTING APPARATUS AND MOVING OBJECT

(71) Applicant: PANASONIC INTELLECTUAL PROPERTY MANAGEMENT CO., LTD., Osaka (JP)

(72) Inventors: Takashi Ohta, Osaka (JP); Nobuyuki Matsui, Osaka (JP); Naotaka Hashimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 15/017,801

(22) Filed: Feb. 8, 2016

(65) Prior Publication Data
US 2016/0238215 A1    Aug. 18, 2016

(30) Foreign Application Priority Data

Feb. 12, 2015 (JP) ................................ 2015-025770

(51) Int. Cl.
*F21V 5/04*    (2006.01)
*B64D 11/00*    (2006.01)

(52) U.S. Cl.
CPC ...... *B64D 11/00* (2013.01); *B64D 2011/0038* (2013.01)

(58) Field of Classification Search
USPC ........................................ 362/62, 97.3, 223
See application file for complete search history.

(56) References Cited

U.S. PATENT DOCUMENTS

| 2003/0037473 A1* | 2/2003 | Pifer | G09F 13/04 40/700 |
| 2005/0169008 A1* | 8/2005 | Okazaki | G03B 15/02 362/558 |
| 2011/0080740 A1* | 4/2011 | Allen | F21V 3/00 362/294 |

(Continued)

FOREIGN PATENT DOCUMENTS

| JP | 3145640 U | 9/2008 |
| JP | 2012-182117 | 9/2012 |

(Continued)

OTHER PUBLICATIONS

U.S. Appl. No. 15/017,752 to Naotaka Hashimoto et al., which was filed Feb. 8, 2016.

*Primary Examiner* — Allyson Trail
(74) *Attorney, Agent, or Firm* — Greenblum & Bernstein, P.L.C.

(57) ABSTRACT

A lighting apparatus includes: a linear light source having an elongated shape; and an optical component which transmits light emitted from the linear light source. The optical component has an entrance surface where the light emitted from the linear light source enters and (ii) an exit surface where the light which has entered the entrance surface exits. The optical component includes, on the exit surface, a light diffuser row including a plurality of light diffusers which are arranged in a line. In a plan view of the exit surface, a first direction in which light-emitting elements included in the linear light source are arranged intersects with a second direction in which the light diffusers are arranged.

11 Claims, 10 Drawing Sheets

(56) References Cited

U.S. PATENT DOCUMENTS

| | | | |
|---|---|---|---|
| 2013/0271970 A1* | 10/2013 | Childers | F21V 5/045 362/218 |
| 2014/0092356 A1* | 4/2014 | Ahn | G02F 1/1339 349/153 |
| 2014/0293595 A1* | 10/2014 | May | F21S 8/04 362/218 |
| 2014/0369068 A1* | 12/2014 | Sakamoto | G09F 13/18 362/609 |
| 2015/0062890 A1* | 3/2015 | Camarota | F21V 5/04 362/223 |
| 2016/0139453 A1* | 5/2016 | Yui | G02B 5/0236 359/599 |
| 2016/0282534 A1* | 9/2016 | Kim | G02B 6/001 |

FOREIGN PATENT DOCUMENTS

| | | |
|---|---|---|
| JP | 2012-252990 | 12/2012 |
| JP | 2014-116236 | 6/2014 |
| WO | 2012/063759 | 5/2012 |
| WO | WO201403717 | * 12/2014 |
| WO | WO2014203717 | 12/2014 |

* cited by examiner

LIGHTING APPARATUS AND MOVING OBJECT

CROSS REFERENCE TO RELATED APPLICATION

This application claims the benefit of priority of Japanese Patent Application Number 2015-025770 filed on Feb. 12, 2015, the entire content of which is hereby incorporated by reference.

BACKGROUND

1. Technical Field

The present disclosure relates to a lighting apparatus, and a moving object including the lighting apparatus.

2. Description of the Related Art

Some lighting apparatuses are surface-emitting lighting apparatuses including a light source and a plate-like optical component which diffuses light from the light source (for example, see Japanese Unexamined Patent Application Publication No. 2014-116236). The light source is, for example, an LED (light-emitting diode) light source which includes a plurality of LED elements. The exit surface of the optical component includes, for example, a plurality of semispherical convex parts each having a diameter ranging from 1 mm to 1.5 mm approximately, as light diffusers.

Such lighting apparatuses are also used in, for example, moving objects such as airplanes. Airplanes generally use elongated linear LED light sources, due to the arrangement space for the lighting apparatuses.

SUMMARY

However, use of an optical component including a plurality of convex parts on the exit surface of the optical component causes spotted unevenness of light output from the exit surface. The unevenness of the light corresponds to the convex parts.

An object of the present disclosure is to provide a lighting apparatus which can reduce unevenness of illumination light, and a moving object including the lighting apparatus.

In order to achieve the above object, a lighting apparatus according to one aspect of the present disclosure includes: a linear light source having an elongated shape and including a plurality of light-emitting elements; and an optical component which transmits light emitted from the linear light source, and has (i) an entrance surface where the light emitted from the linear light source enters and (ii) an exit surface where the light which has entered the entrance surface exits. The optical component includes, on the exit surface, a light diffuser row including a plurality of light diffusers which are arranged in a line. In a plan view of the exit surface, a first direction in which the plurality of light-emitting elements are arranged intersects with a second direction in which the plurality of light diffusers are arranged.

A lighting apparatus according to the present disclosure can reduce unevenness of illumination light.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, a lighting apparatus, and a moving object including the lighting apparatus according to an embodiment of the present disclosure will be described with reference to the drawings. It should be noted that the following embodiment shows one specific preferred example of the present disclosure. The numerical values, shapes, materials, structural elements, the arrangement and connection of the structural elements etc. shown in the following embodiment are mere examples, and therefore do not limit the present disclosure. As such, among the structural elements in the following embodiment, structural elements not recited in any one of the independent claims which indicate the broadest concepts of the present disclosure are described as arbitrary structural elements.

Note that the respective figures are schematic diagrams and are not necessarily precise illustrations. Additionally, similar structural elements share like reference numbers in the drawings.

(Embodiment)

A lighting apparatus and a moving object including the lighting apparatus according to an embodiment will be described with reference to FIG. 1 and FIG. 5B. In the embodiment, an example will be described where the moving object is an airplane.

[1-1. Configuration of Moving Object]

Figure 1:
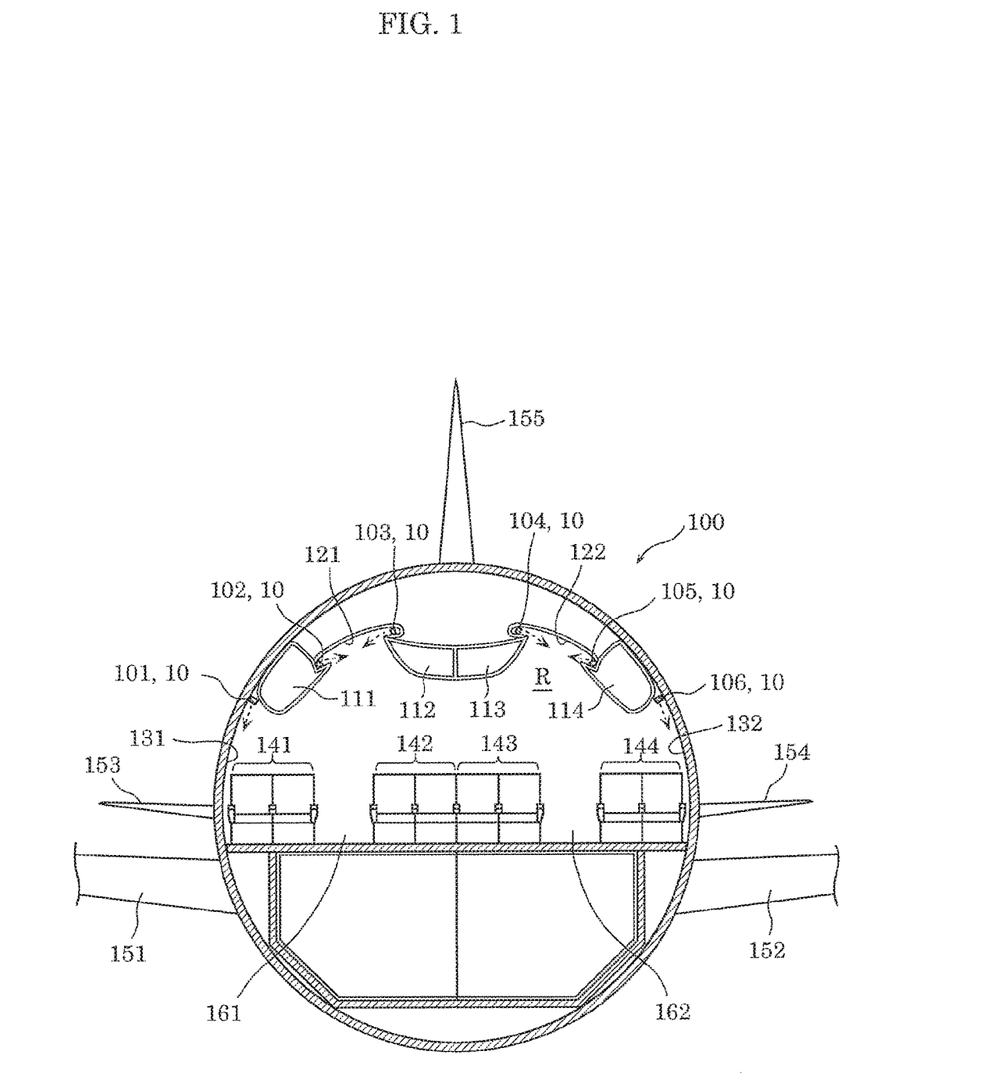
FIG. 1 is an exemplary cross-sectional view of a moving object according to an embodiment.
Figure 2:
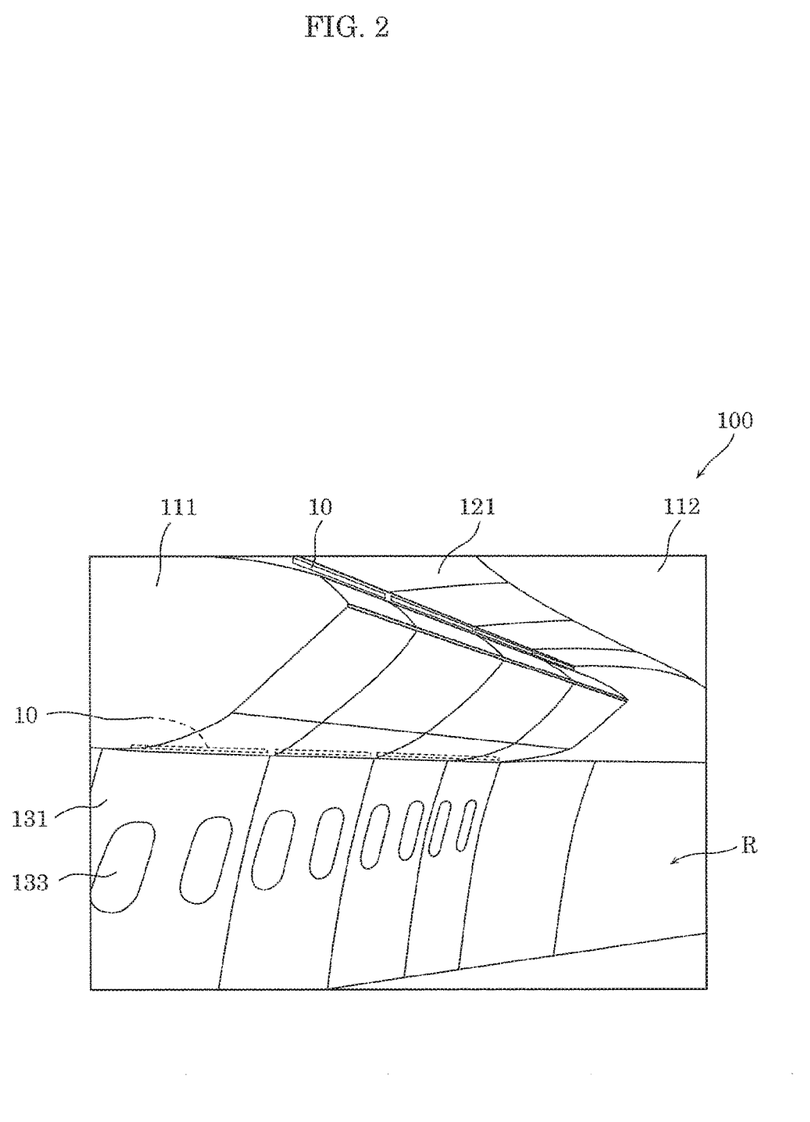
FIG. 2 is a perspective view of an exemplary internal space of the moving object according to the embodiment.
Figure 3:
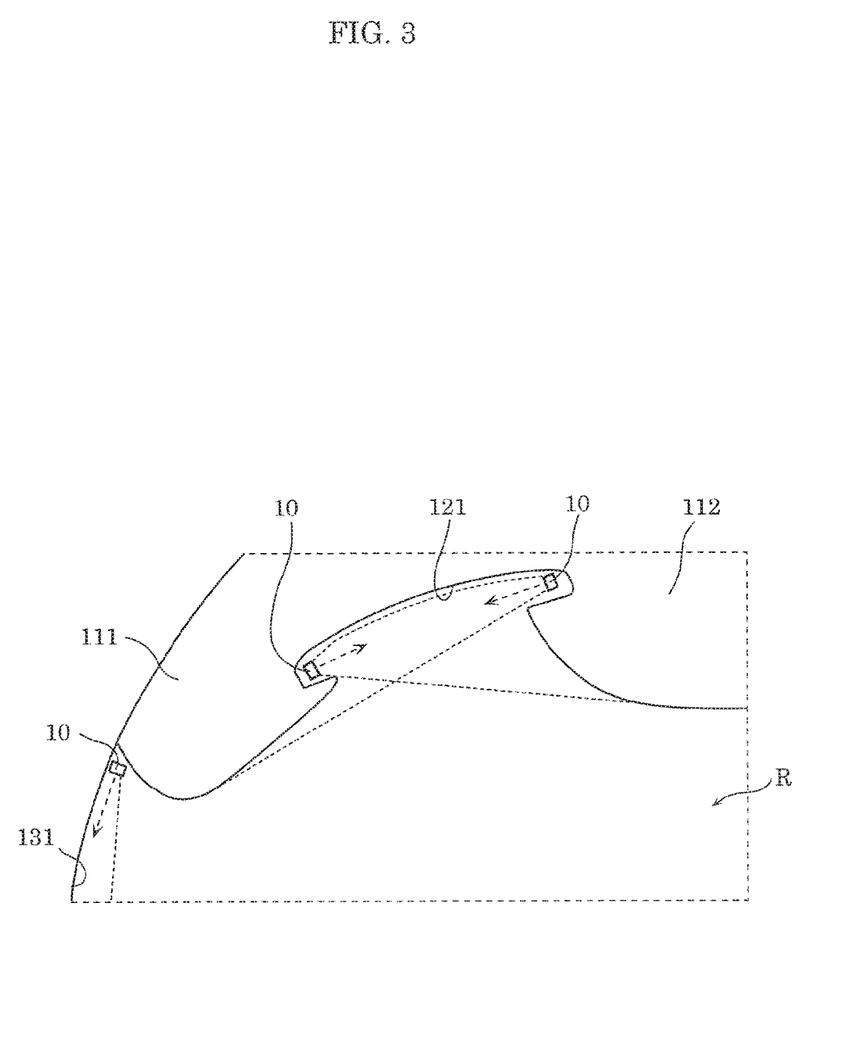
FIG. 3 is a cross-sectional view of an exemplary arrangement of lighting apparatuses in the moving object according to the embodiment.

FIG. 1 illustrates an exemplary cross-section of a moving object. FIG. 2 is a perspective view of an exemplary internal space of the moving object. FIG. 3 is a cross-sectional view of an exemplary arrangement of lighting apparatuses in the moving object.

In cabin R of airplane 100, seat groups 141 to 144, a plurality of overhead bins 111 to 114, and lighting apparatus groups 101 to 106 are arranged. On outside airplane 100, main wings 151 and 152, horizontal stabilizers 153 and 154, and vertical stabilizer 155 are arranged. Airplane 100 includes a plurality of windows 133 in wall surfaces 131 and 132 of the fuselage of airplane 100.

Each of seat groups 141 to 144 includes two lines of seats along the longitudinal direction of airplane 100. In FIG. 1, seat groups 141 to 144 are arranged across walkways 161 and 162. In FIG. 1, seat group 141 includes two lines of seats between wall surface 131 and walkway 161. Seat group 142 includes two lines of seats between walkway 161 and seat group 143. Seat group 143 includes two lines of seats between seat group 142 and walkway 162. Seat group 144 includes two lines of seats between walkway 162 and wall surface 132.

Respective overhead bins 111 to 114 each are elongated storage for baggage, disposed along the longitudinal direction of airplane 100. Overhead bins 111 to 114 are disposed so as to correspond to seat groups 141 to 144. Overhead bins 111 to 114 are arranged on the ceiling above corresponding seat groups 141 to 144. Overhead bins 111 and 112 are configured such that doors open toward walkway 161. Overhead bins 113 and 114 are configured such that doors open toward walkway 162.

Each of lighting apparatus groups 101 to 106 includes a plurality of lighting apparatuses 10 aligned along the longitudinal direction of airplane 100.

Each of lighting apparatuses 10 is a surface-emitting lighting apparatus. Lighting apparatus 10 houses a linear LED light source and an optical component in an elongated case having a rectangular cross-section. Here, the arrangement positions of lighting apparatuses 10 will be described, and the configurations of lighting apparatuses 10 will be described later.

Lighting apparatus groups 101 to 106 are arranged between ceiling 121 or ceiling 122 and one of overhead bins 111 to 114, or between wall surface 131 or wall surface 132 and overhead bin 111 or overhead bin 114. Lighting apparatuses 10 arranged between ceiling 121 or ceiling 122 and one of overhead bins 111 to 114 emit illumination light toward ceiling 121 or ceiling 122. Lighting apparatuses 10 arranged between wall surface 131 or wall surface 132 and overhead bin 111 or overhead bin 114 emit illumination light toward wall surface 131 or wall surface 132.

More specifically, a plurality of lighting apparatuses 10 included in lighting apparatus group 101 are arranged between wall surface 131 and overhead bin 111 in such a manner that illumination light travels toward wall surface 131. A plurality of lighting apparatuses 10 included in lighting apparatus group 102 are arranged between ceiling 121 and overhead bin 111 in such a manner that illumination light travels toward ceiling 121. A plurality of lighting apparatuses 10 included in lighting apparatus group 103 are arranged between ceiling 121 and overhead bin 112 in such a manner that illumination light travels toward ceiling 121. A plurality of lighting apparatuses 10 included in lighting apparatus group 104 are arranged between ceiling 122 and overhead bin 113 in such a manner that illumination light travels toward ceiling 122. A plurality of lighting apparatuses 10 included in lighting apparatus group 105 are arranged between ceiling 122 and overhead bin 114 in such a manner that illumination light travels toward ceiling 122. A plurality of lighting apparatuses 10 included in lighting apparatus group 106 are arranged between wall surface 132 and overhead bin 114 in such a manner that illumination light travels toward wall surface 132.

In a moving object such as an airplane, instead of causing lighting apparatuses 10 to emit illumination light directly toward seat groups 141 to 144, seat groups 141 to 144 are illuminated by light reflected off ceiling 121, ceiling 122, wall surface 131, or wall surface 132.

[1-2. Configuration of Lighting Apparatus]

Figure 4A:
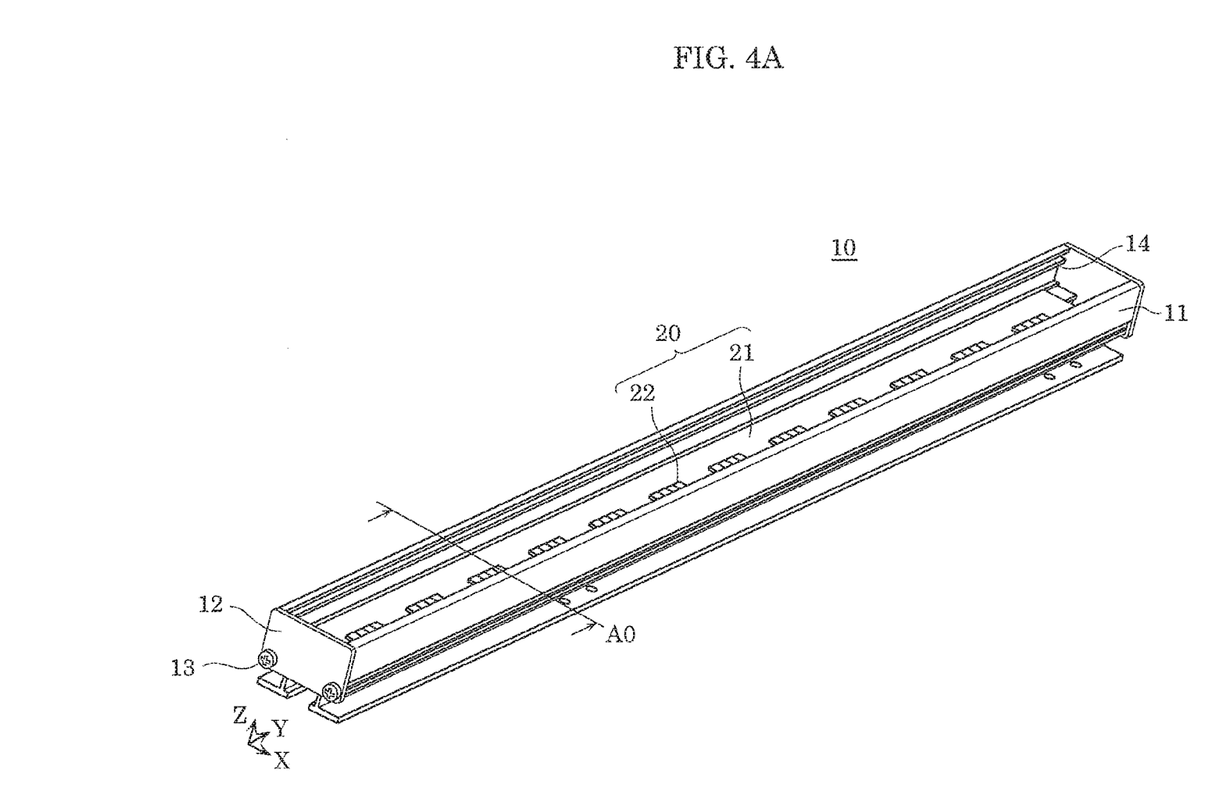
FIG. 4A is a perspective view of an exemplary appearance of a lighting apparatus according to the embodiment.
Figure 4B:
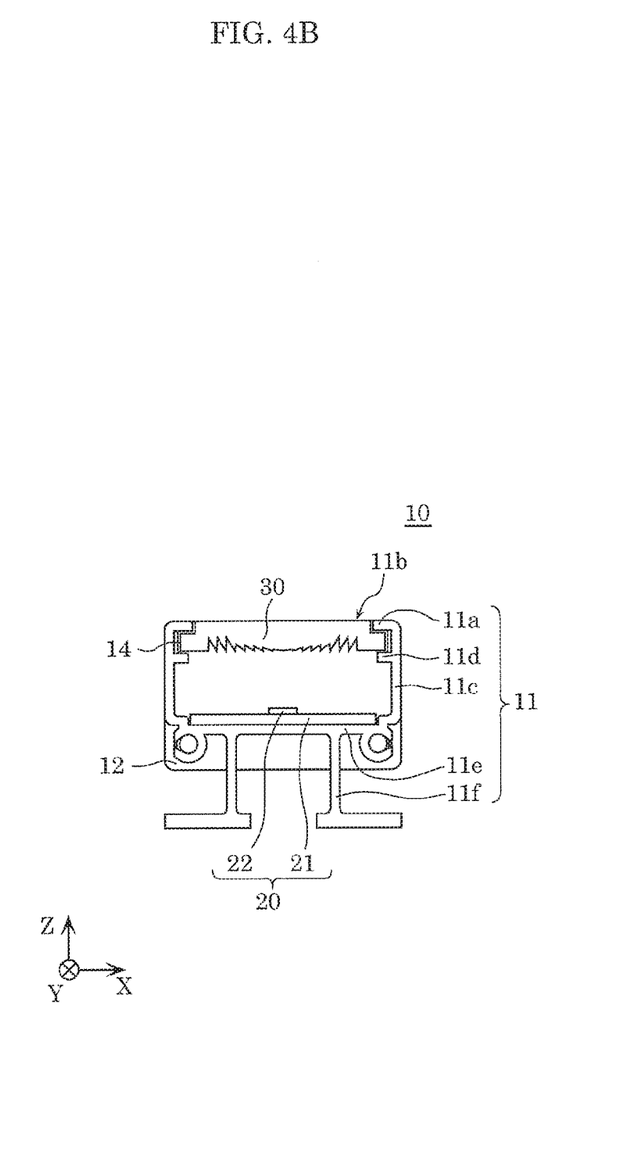
FIG. 4B is a cross-sectional view of an exemplary configuration of the lighting apparatus according to the embodiment.

FIG. 4A is a perspective view of an exemplary appearance of a lighting apparatus according to the embodiment. FIG. 4B is a cross-sectional view of an exemplary configuration of the lighting apparatus according to the embodiment.

In FIG. 4A and FIG. 4B, the Z-axis direction is the direction in which illumination light is output. As described later, case 11 of lighting apparatus 10 has an elongated shape. In FIG. 4A and FIG. 4B, the Y-axis is an axis parallel to the longitudinal direction of case 11 and orthogonal to the Z-axis. The X-axis is an axis orthogonal to the Y-axis and the Z-axis.

In order to facilitate illustration, FIG. 4A illustrates no optical component. FIG. 4B illustrates the cross-section of lighting apparatus 10 parallel to the X-Z plane including line A0 in FIG. 4A, seen from the negative Y-axis side. The optical component is illustrated in FIG. 4B.

As FIG. 4A and FIG. 4B illustrate, lighting apparatus 10 includes case 11, linear light source 20, and optical component 30.

Case 11 is a component which houses linear light source 20 and optical component 30. Case 11 is an elongated component having a rectangular cross section parallel to the X-Z plane.

Top face 11a of case 11 has rectangular opening 11b. Of two faces parallel to the X-Y plane, top face 11a is the face on the positive Z-axis side. Opening 11b is an opening for allowing light emitted from linear light source 20 to exit case 11.

End faces (faces parallel to the X-Z plane) of case 11 are opened. The opened end faces are covered with side plates 12 having rectangular surfaces. When assembling lighting apparatus 10, linear light source 20 and optical component 30 are inserted into case 11 through the opened end faces. As described later, linear light source 20 and optical component 30 are substantially plate-like components having elongated surfaces. After linear light source 20 and optical component 30 are housed in case 11, the end faces are covered with side plates 12. The shape of the surfaces of side plates 12 is approximately the same as the shape of the end faces of case 11. Side plates 12 are fixed to case 11 by screws 13.

Each of side faces 11c of case 11 parallel to the Y-Z plane includes rib 11d for supporting optical component 30. Rib 11d is a plate-like projection which extends toward inside case 11 from side face 11c. The shape of the plane of rib 11d parallel to the X-Y plane is rectangular. The length of rib 11d in the Y-axis direction is the same as the length of case 11 in the Y-axis direction. The length of rib 11d in the X-axis direction is determined so that the distance between two ribs 11d is longer than the length of opening 11b of top face 11a in the X-axis direction. In other words, as FIG. 4B illustrates, the length of rib 11d in the X-axis direction is shorter than the length of top face 11a in the X-axis direction (the length from side face 11c to opening 11b).

End portions 30d of optical component 30 to be described later are inserted between top face 11a and ribs 11d of case 11. The internal length of case 11, the length of linear light source 20, and the length of optical component 30, in the X-axis direction are substantially the same. The length of opening 11b in the X-axis direction and the distance between two ribs 11d are shorter than the length of optical component 30 in the X-axis direction. The area of the region of top face 11a which contacts optical component 30 (in the X-axis direction) and the area of the region of rib 11d which contacts optical component 30 are the areas necessary for fixing optical component 30.

Bottom face 11e of case 11 includes a recess in which linear light source 20 can be disposed. The depth of the recess is less than the thickness of substrate 21 of linear light source 20. Linear light source 20 is fixed to case 11 by adhesive, screws, or combination thereof.

Legs 11*f* are disposed below bottom face 11*e* (on the negative Z-axis side) for fixing lighting apparatus 10 to ceiling 121, ceiling 122, wall surface 131, or wall surface 132 of airplane 100. Legs 11*f* have a plurality of circular openings for screwing lighting apparatus 10 to ceiling 121, ceiling 122, wall surface 131, or wall surface 132.

As FIG. 4A and FIG. 4B illustrate, linear light source 20 includes a plurality of LED groups 22 on plate-like substrate 21 having an elongated surface. In the embodiment, each of LED groups 22 includes LED elements of four colors, which are red LED element 22R, green LED element 22G, blue LED element 22B, and white LED element 22W (not illustrated in FIG. 4A and FIG. 4B, see FIG. 5B).

Four LED elements 22R, 22G, 22B, and 22W are an example of the light-emitting elements. In the embodiment, LED elements 22R, 22G, 22B, and 22W are aligned along a straight line (the straight line indicting first direction L1) which is parallel to the longitudinal direction of substrate 21 and which passes the center of substrate 21. Moreover, in the embodiment, a plurality of LED groups 22 are arranged along the straight line (see FIG. 5B).

LED elements 22R, 22G, 22B, and 22W need not be linearly arranged. Any other arrangement may also be used such as an arrangement in which each LED group 22 includes four LED elements 22R, 22G, 22B, and 22W arranged in a matrix of 2×2.

[1-3. Configuration of Optical Component]

Figure 5A:
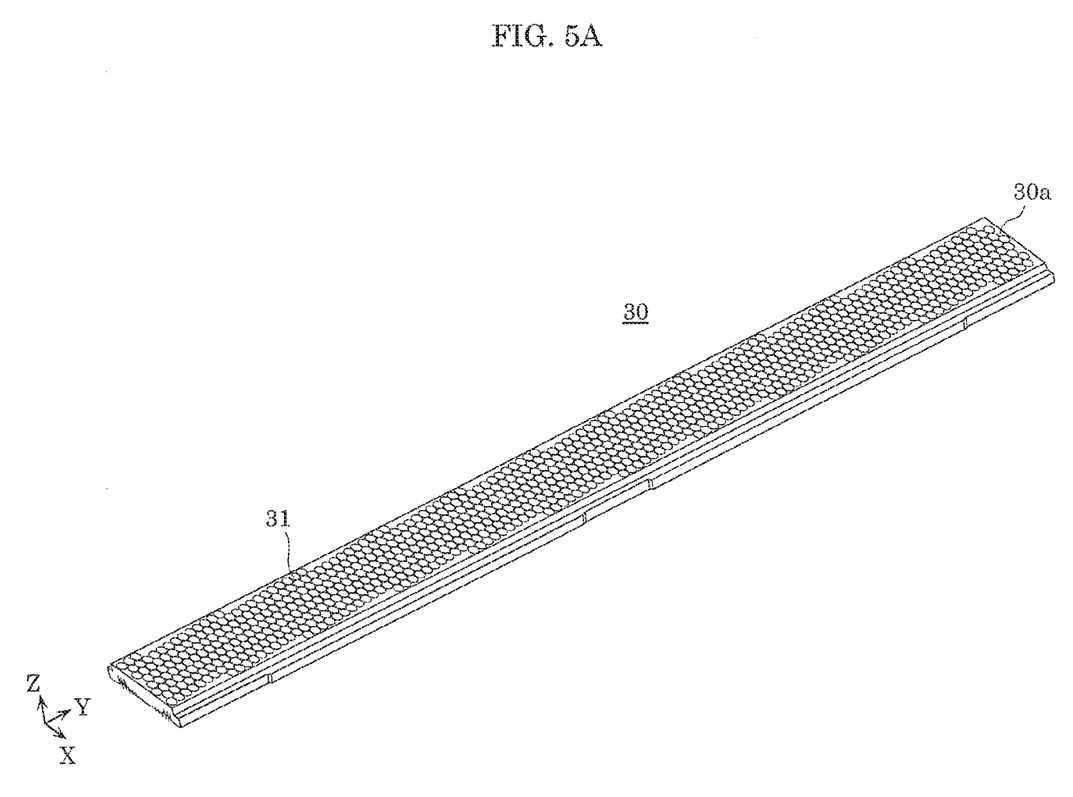
FIG. 5A is a perspective view of an exemplary appearance of an optical component according to the embodiment.

FIG. 5A is a perspective view of an exemplary appearance of an optical component according to the embodiment. FIG. 5B is a top view of an exemplary configuration of the optical component according to the embodiment. FIG. 5C is a side view of an exemplary configuration of the optical component according to the embodiment. FIG. 5C illustrates a cross section of a plane of the optical component parallel to the Z-axis including line A1 in FIG. 5B.

Figure 5B:
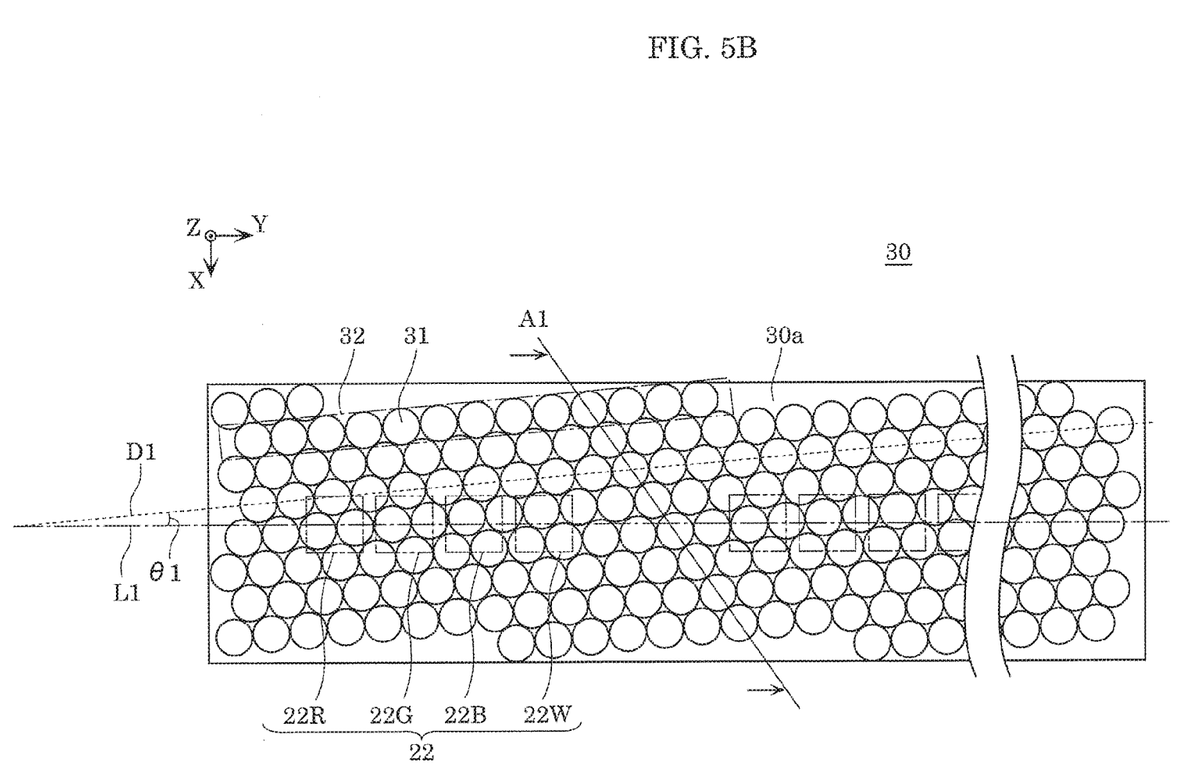
FIG. 5B is a top view of an exemplary configuration of the optical component according to the embodiment.
Figure 5C:
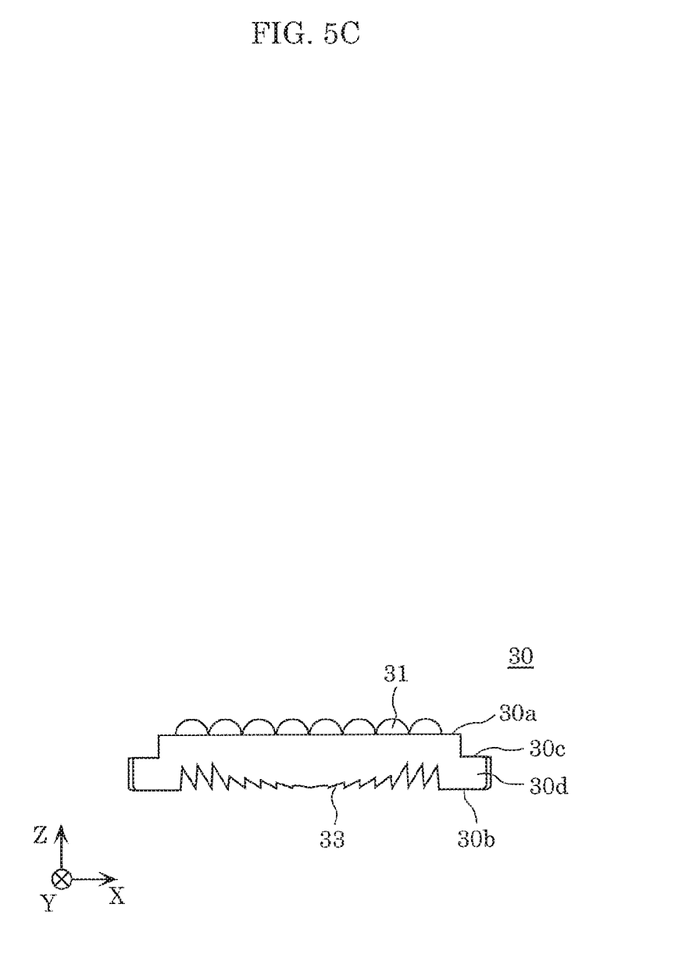
FIG. 5C is a side view of an exemplary configuration of the optical component according to the embodiment.

Optical component 30 illustrated in FIG. 5A to FIG. 5C transmits light emitted from linear light source 20. Optical component 30 is a plate-like component having an elongated surface. Optical component 30 according to the embodiment diffuses outgoing light in the longitudinal direction (Y-axis direction), and condenses outgoing light to a certain degree in the X-axis direction orthogonal to the longitudinal direction. Diffusing the outgoing light in the longitudinal direction reduces unevenness of brightness caused between a region between one lighting apparatus 10 and another lighting apparatus 10, and a region directly illuminated by lighting apparatus 10. Moreover, condensing the outgoing light to a certain degree in the X-axis direction allows a large amount of light to be efficiently emitted to the ceiling or a wall.

Optical component 30 is a plate-like component having a rectangular plane (which is parallel to the X-Y plane). Optical component 30 has, for example, a length ranging from 15 cm to 30 cm in the longitudinal direction (Y-axis direction), a length of approximately 3 cm in the X-axis direction, and a thickness of approximately 3 mm.

The materials of optical component 30 are not particularly limited, as long as they are light-transmissive materials. In the embodiment, optical component 30 is made of polycarbonate. Optical component 30 may be made of acrylic, silicone, glass, or the like.

Optical component 30 has: elongated entrance surface 30*b* where light from linear light source 20 enters; and elongated exit surface 30*a* where light which has entered entrance surface 30*b* exits.

Entrance surface 30*b* includes Fresnel grooves 33. In other words, entrance surface 30*b* of optical component 30 includes a Fresnel lens which condenses light, which has entered entrance surface 30*b*, in the direction perpendicular to the longitudinal direction of optical component 30. Fresnel grooves 33 include, for example, entrance portions where light from linear light source 20 directly enters, and reflective portions which reflect the light which has entered the entrance portions.

Exit surface 30*a* includes a plurality of light diffuser rows 32 each including a plurality of light diffusers 31 which are arranged in a line. Each of light diffusers 31 has a convex curved surface. In the embodiment, light diffuser 31 is a semispherical convex part having a diameter ranging from 1.0 mm to 2.0 mm, and a height of approximately 0.1 mm. The shape of light diffuser 31 is not limited to the semispherical convex, but may be conical, triangular pyramid, or concave. When the area of the base of light diffuser 31 is approximately 2 mm$^2$, and the base is circular, the diameter ranges, for example, from 0.2 mm to 2 mm. Light diffuser 31 may have different sizes.

As described above, light diffusers 31 used to cause optical component 30 to diffuse light can reduce unevenness of illumination light (or unevenness which appears on the surface illuminated by light) with a relatively low loss. Moreover, as light diffusers 31 are highly-reproducible, lighting apparatus 10 having a desired light distribution angle can be reproducibly manufactured.

FIG. 5B illustrates an arrangement of light diffusers 31. As FIG. 5B illustrates, first direction L1, in which a plurality of LED elements are arranged, intersects with second direction D1 in which a plurality of light diffusers 31 are arranged, in a plan view of exit surface 30*a*. First direction L1 and second direction D1 are both indicated by straight lines. Here, the angle formed by first direction L1 and second direction D1 is θ1. First direction L1 of the LED elements intersect with second direction D1 of light diffusers 31 (0<θ<90 degrees). This reduces unevenness of light output from optical component 30. More specifically, when first direction L1 is parallel to second direction D1, light output from optical component 30 involves spotted unevenness. In contrast, in the embodiment, as first direction L1 intersects with second direction D1, the spotted unevenness is reduced.

As FIG. 5C illustrates, edges 30*d* of exit surface 30*a* of optical component 30 in the X-axis direction include cutouts having rectangular X-Z planes. The shape of these cutouts depends on the shape of top face 11*a* of case 11. In other words, cutouts are provided in the regions which contacts exit surface 30*a*. With such a structure, exit surface 30*a* covers opening 11*b* of case 11. Moreover, edges 30*d* of optical component 30 in the X-axis direction are inserted between top face 11*a* and ribs 11*d* of case 11, and optical component 30 is fixed to case 11.

[2. Variation 1 of Lighting Apparatus]

Variation 1 of the above embodiment will be described with reference to FIG. 6. In Variation 1, second direction D2 in which light diffusers 31 are arranged is different from second direction D1 in which light diffusers 31 are arranged in the above embodiment. For the purpose of illustration, FIG. 6 illustrates only first light diffusers 31 in light diffuser rows 32.

Figure 6:
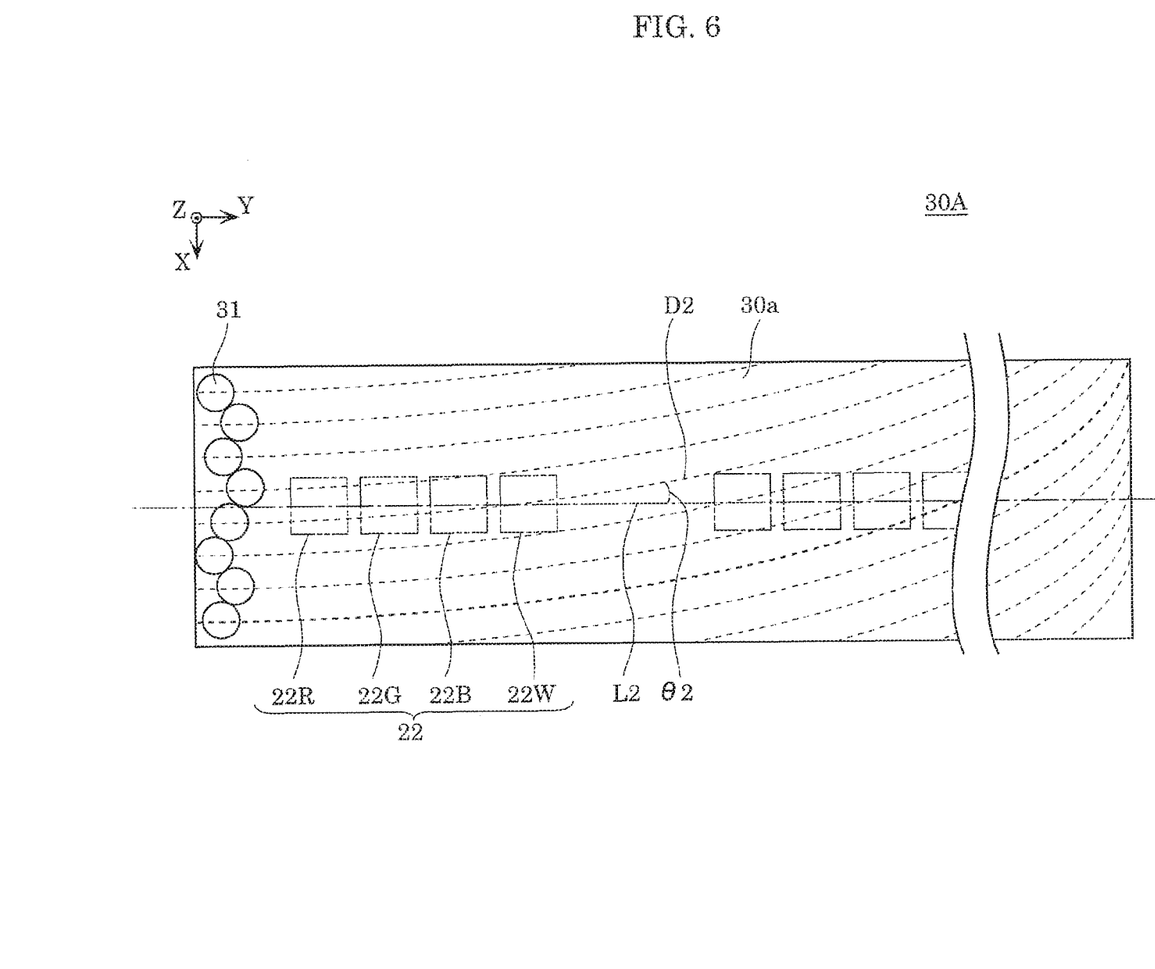
FIG. 6 is a top view of an exemplary configuration of an optical component according to Variation 1 of the embodiment.

FIG. 6 is a top view of an exemplary configuration of optical component 30A according to Variation 1. As FIG. 6 illustrates, first direction L2 in which LED elements 22R, 22G, 22B, and 22W are arranged is straight, whereas second direction D2 in which light diffusers 31 are arranged is curved. Angle θ2 formed by first direction L2 and second direction D2 gradually increases from the negative Y-axis side toward the positive Y-axis side.

[3. Variation 2 of Lighting Apparatus]

Figure 7:
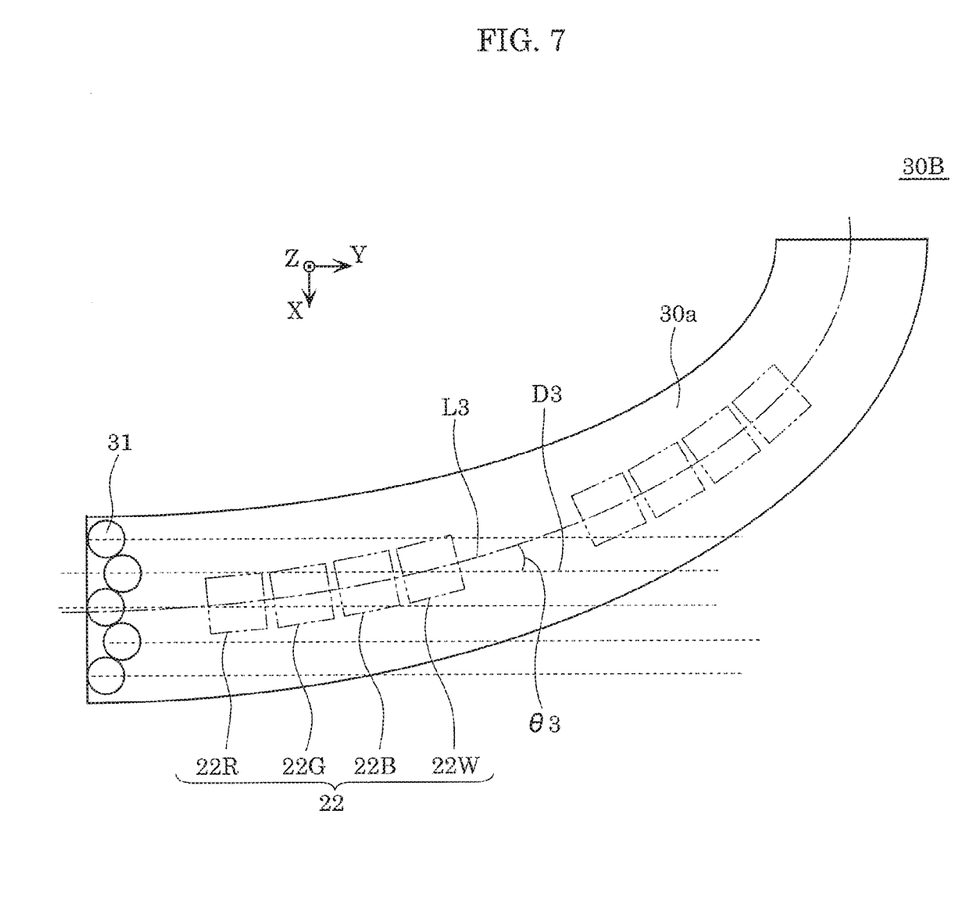
FIG. 7 is a top view of an exemplary configuration of an optical component according to Variation 2 of the embodiment.

Variation 2 of the above embodiment will be described with reference to FIG. 7. In Variation 2, a case will be described where the shapes of linear light source 20 and optical component 30B are different from the shapes of linear light source 20 and optical components 30 and 30A in the embodiment and Variation 1. For the purpose of illustration, FIG. 7 illustrates only first light diffusers 31 in light diffuser rows 32. Light diffusers 31 are actually arranged across entire optical component 30B.

FIG. 7 is a top view of an exemplary configuration of optical component 30B according to Variation 2. As FIG. 7 illustrates, in Variation 2, optical component 30B and substrate 21 of linear light source 20 are curved toward the negative X-axis side as it moves in the direction of the positive Y-axis side. LED elements 22R, 22G, 22B, and 22W are arranged along the curved shape. In FIG. 7, first direction L3 is indicated by a curved line which corresponds to the shapes of optical component 30B and substrate 21 of linear light source 20.

In Variation 2, second direction D3 in which light diffusers 31 are arranged is straight.

With such a structure, angle θ3 formed by first direction L3 and second direction D3 gradually increases from the negative Y-axis side to the positive Y-axis side.

[4. Advantageous Effects, Etc.]

In the lighting apparatuses according to the embodiment, Variation 1, and Variation 2, the first direction in which LED elements 22R, 22G, 22B, and 22W are arranged intersects with the second direction in which light diffusers 31 are arranged, in a plan view of exit surface 30a. Accordingly, spotted unevenness of light output from optical component 30 is reduced.

Reduction in unevenness of light output from optical components 30, 30A, and 30B can improve the quality of lighting of lighting apparatus 10. Lighting apparatus 10 is useful, for example, when installed on airplane 100, in particular, when high quality of lighting is required.

(Other Embodiments)

The lighting apparatus and the moving object according to the present disclosure have been described based on the above embodiment and variations thereof. However, the present disclosure is not limited to the above embodiment and variations thereof.

For example, in the above embodiment and variations thereof, light diffusers 31 are used to cause optical components 30, 30A, and 30B to diffuse light; however, a light diffusing unit other than light diffuser 31 may be used. For example, diffusing materials may be dispersed in optical component 30. This can further reduce unevenness of illumination light. Moreover, diffusing materials may be used to increase the light distribution angle of lighting apparatus 10. For example, diffusing materials are dispersed in an optical component including concave light diffusers so as to have a haze value of 50% approximately. This can increase the light distribution angle in the direction perpendicular to the longitudinal direction of the optical component by approximately 7 degrees. In this case, the center intensity (luminous intensity in the direction perpendicular to the exit surface of the optical component of the lighting apparatus) is reduced to approximately 56% of the case where no diffusing material is used.

Moreover, emboss processing may be applied to the exit surface of optical component 30 to cause optical component 30 to diffuse light. Emboss processing can be implemented by, for example, blasting.

Moreover, in the above embodiment and variations thereof, at least one of the first direction or the second direction is straight; however, both the directions may be curved.

Moreover, for example, in the above embodiment, Variation 1, and Variation 2, linear light source 20 is arranged along a single line; however, the arrangement is not limited to such an example. For example, it may be that a plurality of LED groups 22 as a whole are arranged linearly, but each LED group 22 is arranged diagonally relative to the longitudinal direction of substrate 21. In this case, the first direction is not the direction in which the plurality of LED groups as a whole are arranged, but the direction in which LED elements 22R, 22G, 22B, and 22W of each LED group 22 are arranged.

In the above embodiment, Variation 1, and Variation 2, the examples have been described in which optical component 30 is a plate-like component having an elongated surface; however, the shape is not limited to the examples. The shape may be any shape such as columnar instead of plate-like shape.

Forms obtained by various modifications to the embodiment and the variations thereof that can be conceived by a person of skill in the art as well as forms realized by arbitrarily combining structural elements and functions in the embodiment which are within the scope of the essence of the present disclosure are included in the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus comprising:
   a linear light source having an elongated shape, the linear light source including a plurality of light-emitting elements; and
   an optical component that has a flat plate shape and which transmits light emitted from the linear light source, the optical component having (i) an entrance surface where the light emitted from the linear light source enters and (ii) an exit surface where the light which has entered the entrance surface exits, the exit surface being opposite to the entrance surface, the optical component including, on the exit surface, a light diffuser row including a plurality of light diffusers which are arranged in a line,
   wherein, in a plan view of the exit surface, a first direction in which the plurality of light-emitting elements are arranged, intersects with a second direction, in which the plurality of light diffusers are arranged.

2. The lighting apparatus according to claim 1,
   wherein an angle formed by the first direction and the second direction gradually increases from a first end of the linear light source toward a second end of the linear light source.

3. The lighting apparatus according to claim 1,
   wherein the first direction is curved.

4. The lighting apparatus according to claim 1,
   wherein the optical component includes a plurality of Fresnel grooves on the entrance surface.

5. The lighting apparatus according to claim 1,
   wherein each of the plurality of light diffusers has a convex curved surface.

6. A moving object comprising
   the lighting apparatus according to claim 1.

7. The lighting apparatus according to claim 1, the light diffuser row comprises a plurality of rows each including a plurality of light diffusers.

8. The lighting apparatus according to claim 1, wherein the first direction and the second direction intersect at an angle of less than 90°.

9. The lighting apparatus according to claim 1, wherein each of the plurality of light diffusers comprises an arcuate projection extending outwardly from the exit surface.

10. The lighting apparatus according to claim 9, wherein each of the arcuate projections is discrete.

11. The lighting apparatus according to claim 1, wherein the second direction is curved.

* * * * *